(12) United States Patent
Mischler

(10) Patent No.: US 8,752,811 B2
(45) Date of Patent: Jun. 17, 2014

(54) SYMMETRICAL HEAD MOUNTED TUNED MASS DAMPER

(75) Inventor: Peter L. Mischler, Rockton, IL (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 280 days.

(21) Appl. No.: 13/294,612

(22) Filed: Nov. 11, 2011

(65) Prior Publication Data

US 2013/0118848 A1    May 16, 2013

(51) Int. Cl.
*B25D 17/24* (2006.01)

(52) U.S. Cl.
USPC .......................................... 267/137; 173/162.1

(58) Field of Classification Search
USPC ............ 267/136, 137; 173/162.1, 162.2, 210, 173/211; 188/378–380
See application file for complete search history.

(56) References Cited

U.S. PATENT DOCUMENTS

| | | | |
|---|---|---|---|
| 1,819,665 A | 8/1931 | Wiltse | |
| 2,586,157 A | 2/1947 | Gasser et al. | |
| 2,875,731 A * | 3/1959 | Settles et al. | 267/137 |
| 3,230,831 A | 1/1966 | Harker | |
| 3,486,585 A | 12/1969 | Richter et al. | |
| 3,522,864 A | 8/1970 | Richter | |
| 3,690,414 A | 9/1972 | Aggarwal et al. | |
| 4,739,674 A * | 4/1988 | Hori | 74/551.9 |
| 5,775,472 A * | 7/1998 | Osterberg et al. | 188/378 |
| 5,871,315 A | 2/1999 | Burt et al. | |
| 5,915,508 A * | 6/1999 | Lai | 188/379 |
| 5,954,169 A | 9/1999 | Jensen | |
| 6,719,503 B1 | 4/2004 | McCalmont et al. | |
| 6,722,481 B2 | 4/2004 | Maeno et al. | |
| 6,991,077 B2 | 1/2006 | Maeno et al. | |
| 7,661,912 B2 | 2/2010 | Onozuka et al. | |
| 7,690,872 B2 | 4/2010 | Hashimoto et al. | |
| 7,712,548 B2 * | 5/2010 | Moessnang | 173/162.1 |
| 7,980,323 B2 * | 7/2011 | Wilson | 173/162.1 |
| 8,066,106 B2 * | 11/2011 | Moessnang | 188/380 |
| 8,434,565 B2 * | 5/2013 | Hecht et al. | 173/162.1 |

* cited by examiner

*Primary Examiner* — Christopher Schwartz
(74) *Attorney, Agent, or Firm* — Reising Ethington P.C.

(57) ABSTRACT

A tuned mass damper is designed for a machine tool head that moves in the X, Y, and Z directions and rotates around a C-axis that is coincident with the axis of an arm that supports the head. The damper comprises a pair of damper masses symmetrically arranged around the head. Each damper mass has a center of gravity which is approximately in the geometric center of the mass. A resilient mounting is provided for each of the damper masses allowing the damper masses to damp out vibration in the X and Y directions regardless of the orientation of the head.

18 Claims, 4 Drawing Sheets

SYMMETRICAL HEAD MOUNTED TUNED MASS DAMPER

FIELD

The device relates a pair of tuned mass dampers that are symmetrically mounted on the multi-axis head of a machine tool.

BACKGROUND

Precision machine tools often have vibration which has to be damped out in order to obtain the best performance out of the tool. In a multi-axis machine tool, the vibration of the tool is the greatest at the far end of the unsupported mass, i.e., at the head of the tool, since this is where the greatest absolute motion occurs. This is also the location where the mass of a mass damper could be minimized. However, the head of the tool is a difficult area to mount a tuned mass damper, since the space is limited and the head must move in 2 or 3 linear axes, and in 1 or 2 rotary axes.

SUMMARY

A tuned mass damper is provided for a machine tool head that has a rotary tool and moves in the X, Y, and Z directions. The head pivots around the A-axis of the head, and rotates around a C-axis that is coincident with the long axis of the arm. The damper comprises a pair of damper masses symmetrically arranged around the head. Each damper mass has a center of gravity which is approximately in the geometric center of the mass. A resilient mounting is provided for each of the damper masses allowing the damper masses to damp out vibration in the X and Y directions regardless of the orientation of the C-axis.

DESCRIPTION OF THE PREFERRED EMBODIMENT

Figure 1:
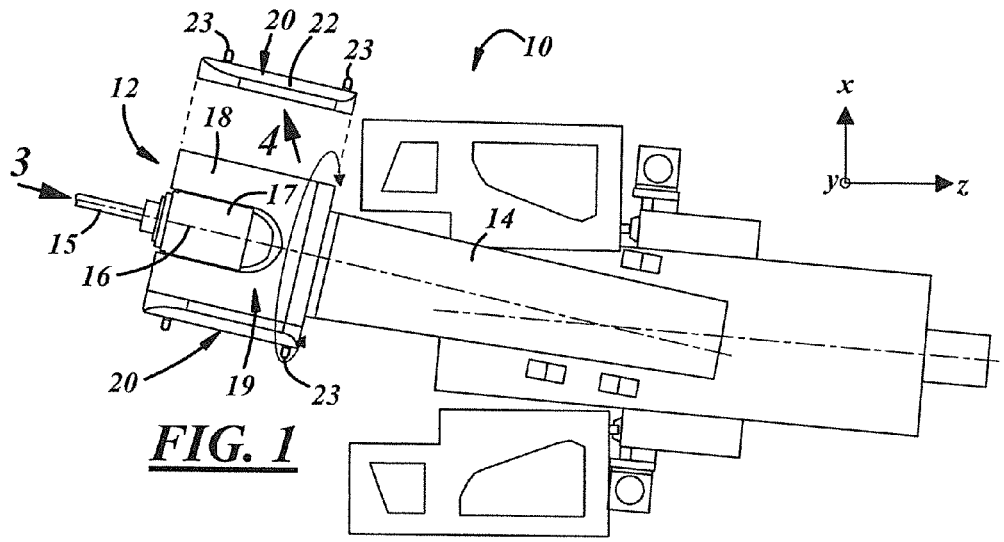
FIG. 1 is a plan view of a machine tool with a multi-axis head mounted on the end of a cantilever arm.
Figures 2, 3:
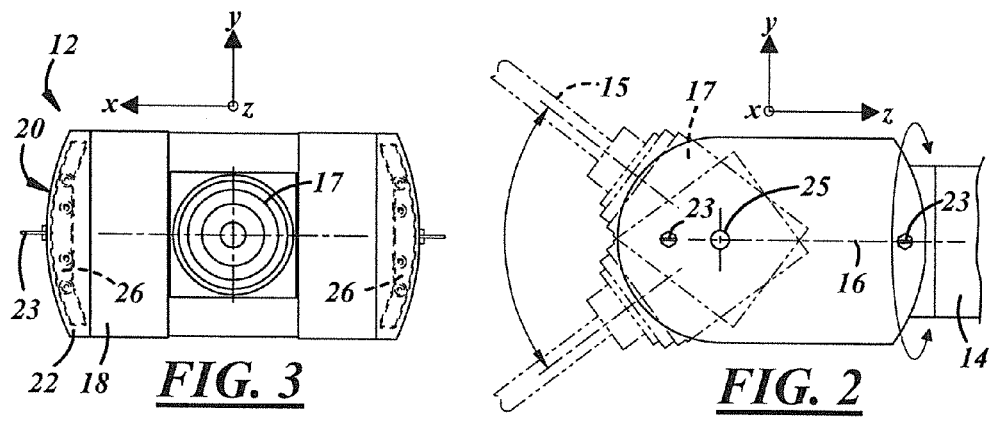
FIG. 2 is a side view of a multi-axis head showing pivoting motion of the head about the A-axis 25 of the head.
FIG. 3 is a front view of a multi-axis head.

FIG. 1 is a plan view of a machine tool 10 with a multi-axis head 12 mounted on the end of a cantilever arm 14. The multi-axis head 12 supports a tool 15 which is used to machine a workpiece (not shown) and is able to change its position and orientation relative to the arm 14 and the workpiece. The head 12 has a C-axis of rotation 16 that is in alignment with the long axis of the arm 14. The head 12 includes a spindle 17 that is moveably mounted between two arms 18 of a fork 19 for pivoting motion about the A-axis of the head so that the spindle 17 may change the angle of the tool relative to the cantilever arm 14 as best seen in FIG. 2. Dampers 20 are symmetrically mounted on both sides of the fork 19 to dampen out unwanted vibration. The dampers 20 include removable covers 22 that protect the dampers from debris created during a machining operation. Safety hoist rings 23 may be provided on the covers 22 to aid in removal of the dampers 20 from the head 12.

FIG. 2 is a side view of a multi-axis head 12 showing pivoting motion of the spindle 17 about the A-axis 25 of the head. The pivoting motion allows the tool 15 to change its angular orientation relative to the C-axis 16 of the arm 14 that supports the head and relative to a workpiece.

FIG. 3 is a front view of the multi-axis head 12 of FIGS. 1 and 2 showing a spindle 17 mounted between the two arms 18 of a fork 19. Dampers 20 are symmetrically mounted on both sides of the head 12. A damper mass 26 is shown in phantom within each of the damper covers 22.

Figure 4:
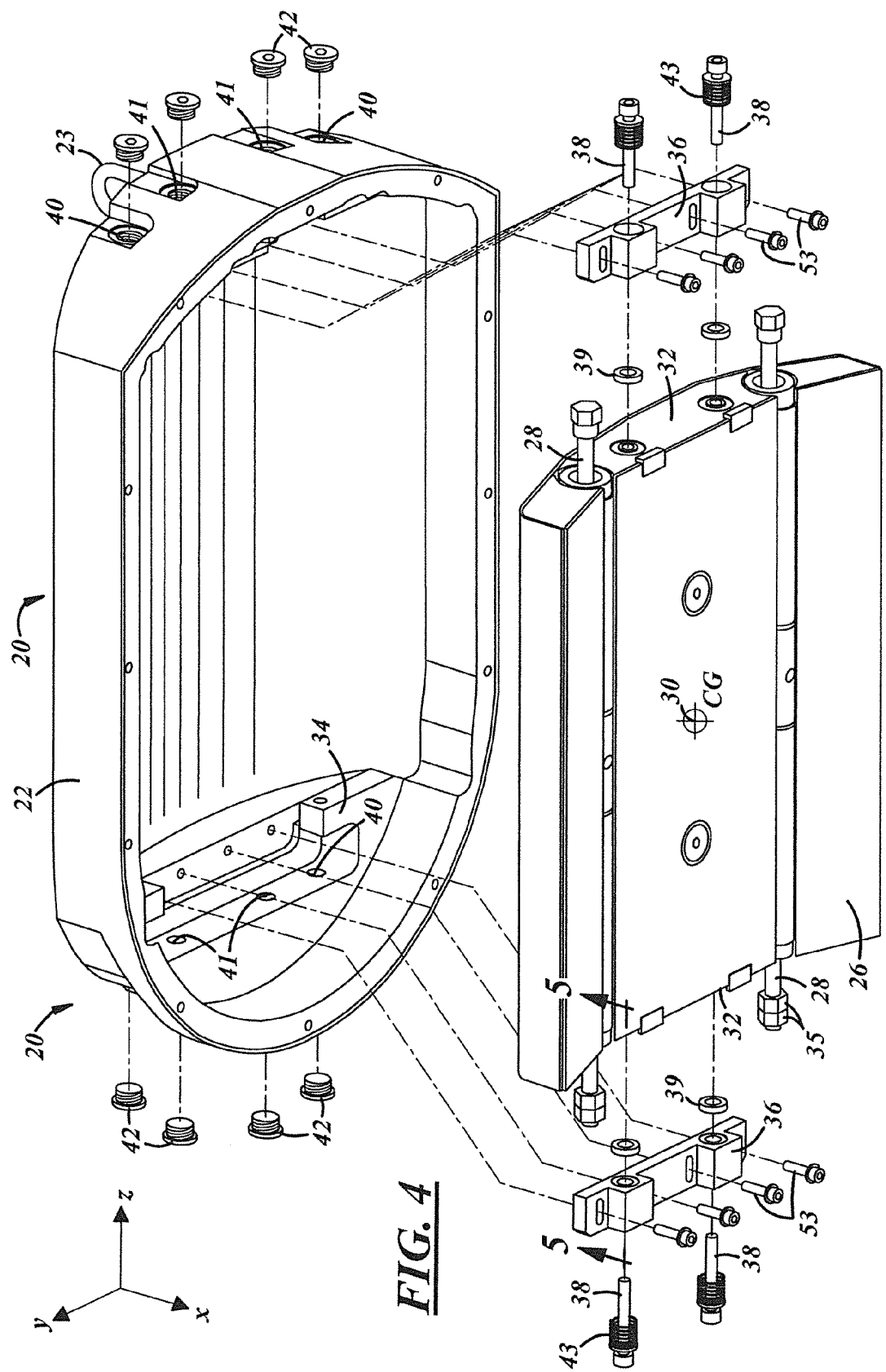
FIG. 4 is an exploded perspective view of the underside of a cover for one of the dampers for the multi-axis head.
Figure 7:
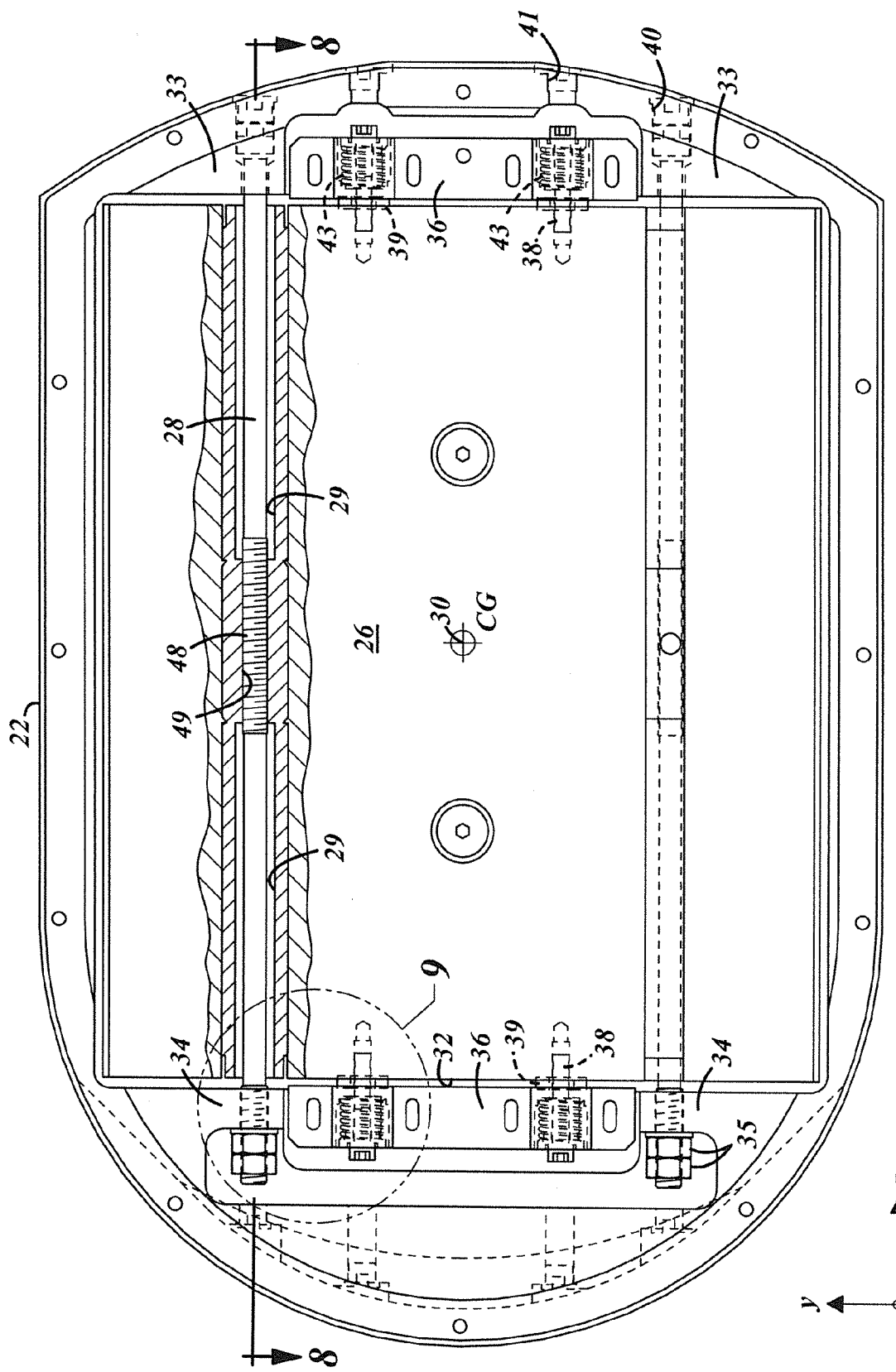
FIG. 7 is a plan view showing the underside of the cover with the damper mass, the support rods, and the biasing bolts in place.
Figure 8:
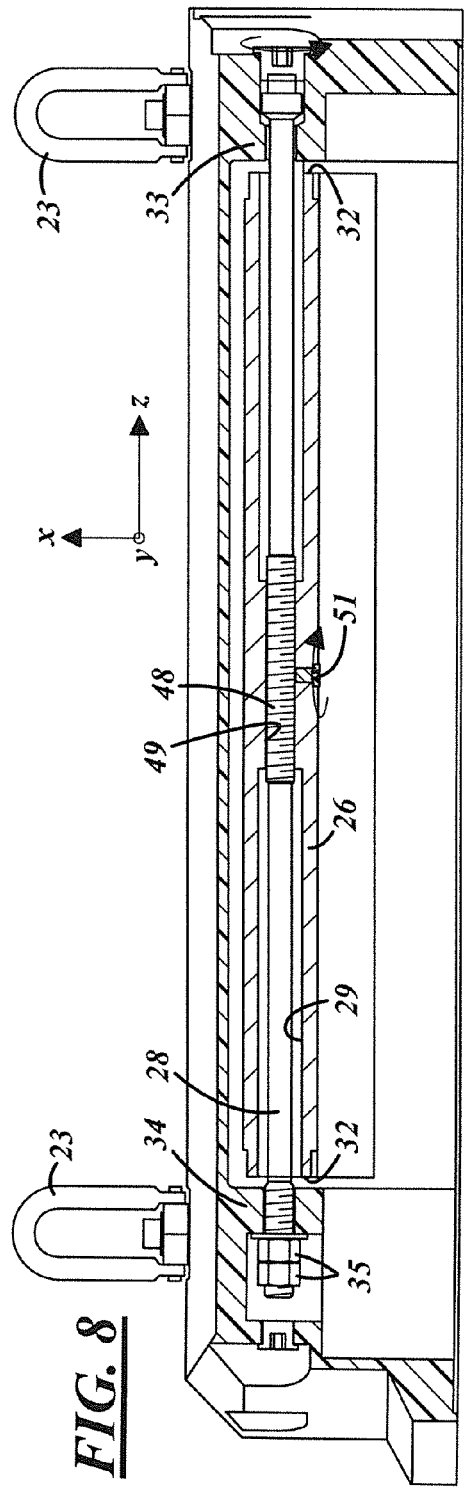
FIG. 8 is a sectional view taken along line 8-8 of FIG. 7 showing the support rods in place in the damper mass.

FIG. 4 is an exploded perspective view of the damper 20. The damper 20 comprises a damper cover 22 and a damper mass 26 of material such as lead. The damper mass 26 is supported in the cover by two support rods 28 that pass through elongated passages 29 formed in the damper mass as best seen in FIGS. 7 and 8. Each damper mass 26 has a center of gravity 30 which is located approximately midway between the support rods 28 and midway between the two ends 32 of the damper mass. Support rod mounting brackets 33 and 34 are attached to the inside of the cover 22 and the support rods 28 pass through the support rod mounting brackets. The two support rods 28 are symmetrically located around the center of gravity 30 of the damper mass and are attached to the damper mass 26 near the center of their lengths as best seen in FIGS. 7 and 8. One or more nuts 35 may be threaded on the ends of each of the support rods 28 to secure the rods to the support rod mounting brackets 33 and 34. A donut support block 36 is mounted on each end of the damper mass 26 by biasing bolts 38. Resilient mounts such as rubber donuts 39 are mounted on the biasing bolts 38 and are captured between the donut support block 36 and the end 32 of the damper mass 26. The donut support blocks 36 are mounted to the inside of the cover 22 by support block mounting screws 53. First sets of access holes 40 are provided in both ends of the cover 22 to allow insertion and tightening of the support rods 28 that support the damper mass 26 as best seen in FIGS. 4, 7, and 8. Second sets of access holes 41 are provided to allow access to the biasing bolts 38 that are used to preload rubber donuts 39 against the end of the damping mass 26 best seen in FIGS. 4-6. Plugs 42 may be used to seal the first and second sets of access holes 40 and 41, respectively, from dirt and debris once access to the support rods 28 and the biasing bolts is no longer needed. Biasing springs 43 and washers 44 are mounted on the ends of the biasing bolts 38 as best seen in FIGS. 5 and 6.

Figure 5:
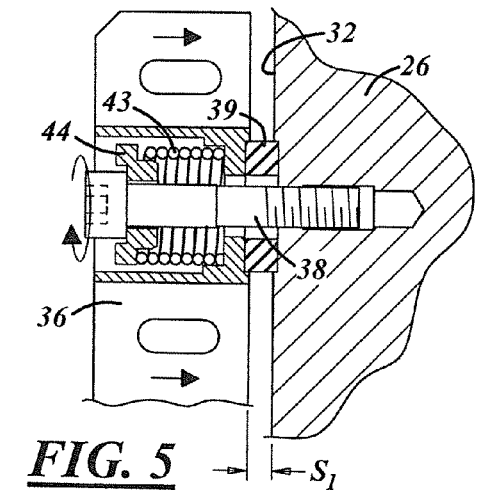
FIG. 5 is a detail view showing the step of tightening the donut mounting blocks to the damper mass.

FIG. 5 shows a biasing bolt 38 tightened in the donut support block 36 to draw the donut support block toward the damping mass 26 to compress a compression member such as a biasing spring 43 to a solid condition. This positions the donut support block 36 a distance S1 from the end 32 of the damper mass.

Figure 6:
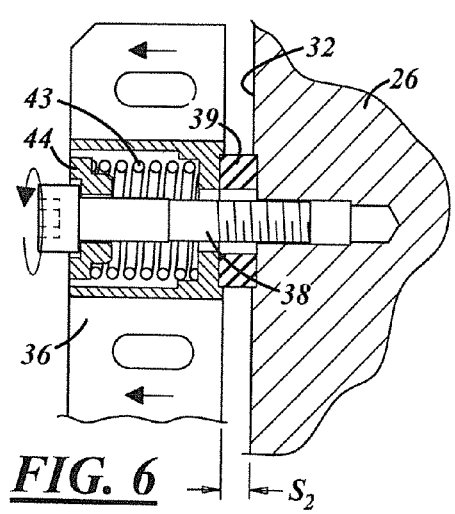
FIG. 6 is a detail view showing the step of loosening the donut mounting blocks on the damper mass.

FIG. 6 shows a biasing bolt 38 loosened in the donut support block 36 to allow the donut support block to move away from the end 32 of the damping mass in order to release some of the compressive force exerted by the biasing spring 43 on the rubber donut 39. This positions the donut support block 36 a distance S2 from the end 32 of the damper mass. The distance S2 is greater than the distance S1.

FIG. 7 is a plan view showing the damper mass 26 in the cover 22 with the support rods 28 and the biasing bolts 38 in place. The donut support blocks 36 are not yet fastened to the cover 22 and are held in place relative to the damper mass by the biasing bolts 38. The support rods 28 are threaded through the first set of access holes 40 in one end of the cover, through the suspension rod mounting bracket 33 in the near end of the cover, and through the elongated passageways 29 in the damper mass until they reach the suspension rod mounting bracket 34 in the far end of the cover. Each support rod 28 has a threaded middle portion 48 to engage a threaded middle portion 49 of the passageway. Except for the reduced diameter threaded middle portion 49 of the passageway, the diameter of the passageway 29 is larger than the diameter of the support rods 28 to allow the support rods 28 to flex in response to motion of the machine tool head 12. The support rods 28 are coupled to their respective damper mass 26 only at their midpoint defined by the threaded portion 48.

FIG. 8 is a sectional view taken along line 8-8 of FIG. 7 showing a support rod 28 supporting the damper mass 26 in the cover. A set screw 51 engages the threaded middle portion 48 of the support rod 28 to prevent the support rod 28 from rotating relative to the damper mass 26 once the final position of the damper mass in the cover 22 has been established.

Figure 9:
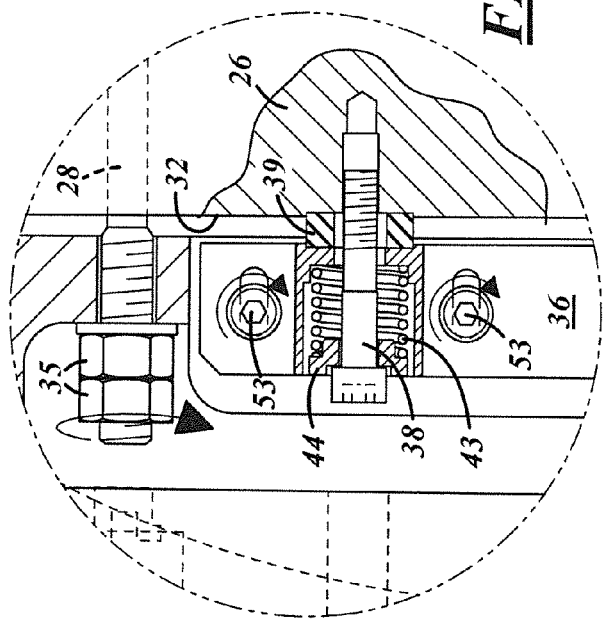
FIG. 9 is a detail view of section 9 of FIG. 7 showing the donut support block bolted in place in the cover.

FIG. 9 is a detail view of section 8 of FIG. 7 showing the biasing bolts 38 holding the rubber donuts 39 and the donut support block 36 in place against the end 32 of the damping mass 26 when the damping mass is positioned in the cover 22. Mounting screws 53 are used to fasten the donut support block 36 in place in the cover 22.

To assemble the damper mass 26 into the cover 22, the biasing bolts with the washers 44 and springs 43 are first threaded into the support blocks 36, through the rubber donuts 39 and into the end 32 of the damper mass. The biasing screws 38 are tightened to compress the springs 43 to a solid condition as shown in FIG. 5, and are then loosened a desired amount as shown in FIG. 6 to apply the required compressive force to the rubber donuts 39. The damper mass 26 with the donut support blocks 36 attached to each end 32 is then placed into the cover 22. The support rods 28 are threaded through the first set 41 of access holes in one end of the cover 22, through the elongated passageways 29 in the damper mass, and are tightened through the reduced diameter threaded middle portion 49 of the passageway 29 until the damper mass is pulled tight against near side mounting bracket 33. The support rods 28 are then loosened to center the damper mass 26 in the cover 22. Set screws 51, best seen in FIG. 8, are then threaded into the damper mass until they are in contact with the threaded portion 48 of the support rods 28 to lock the damper mass 26 in place on the support rods. Nuts 35 are locked onto the ends of the support rods 28, and the support block mounting screws 53 are used to fasten the donut support blocks 36 in place in the cover. Plugs 42 may be placed over the first and second sets of access holes 40 and 41, respectively, to seal the interior of the cover from dirt and debris.

The diameter of the support rods 28 is calculated to bring the frequency of vibration of the damper mass 26 on the support rods in line with the required damper frequency for the machine tool head 12. In use, the support rods 28 act as springs for the damper mass 26. Although the ends of each support rods 28 is fixed in the mounting brackets 33 and 34 in the cover, the remainder of the support rod is free to vibrate in response to the suspended weight of the damper mass 26. The two dampers 20 are paired to create symmetry around the center of the C-axis of rotation of the head 12, and are symmetrically located around the center of gravity of the head. The center of gravity of each damper mass 26 is centered in the Z-direction between the two ends 32 of the damper mass to prevent inducing torsional forces about the X-axis, and between the support rods 28 and the resilient mounts 39 in the Y-direction to avoid torsional forces about the Z-axis. The center of gravity of the damper mass 26 is located on the plane of the support rods 28 and the resilient mounts 39 in the X-direction to avoid torsional forces about the Z-axis.

Because the dampers 20 are mounted on the head 12 and move with the head, the dampers are able to damp vibrations in the X and Y directions. Because the dampers 20 are mounted in the removable covers 22, the covers may be removed for easy access to the head without disturbing the damper set-up. The durometer of the rubber donuts 39 is selected to achieve the desired damper frequency.

Figure 10:
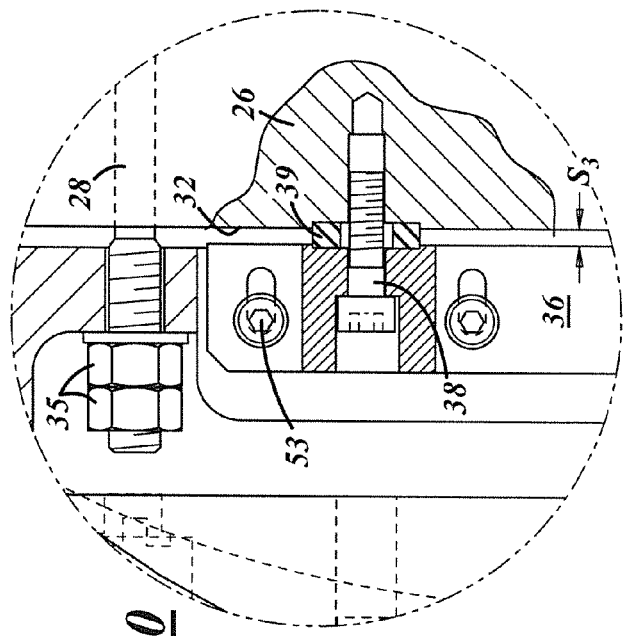
FIG. 10 is a detail view of an alternate form of the device showing the donut support bracket, a biasing bolt and a rubber donut.

FIG. 10 shows an alternate embodiment in which springs are not used to set a preload on the rubber donuts 39 that suspend the damper mass 26. The biasing bolts 38 are in direct contact with the donut support block 36, and the rubber donut 39 is positioned between the donut support block and the end 32 of the damper mass. The biasing force on the rubber donut 39 is determined by the spacing S3 between the donut support block 36 and the end 32 of the damper mass 26. The biasing bolt 38 holds the rubber donut 39 between the donut support block 36 and the end of the damper mass 26. The biasing bolt 38 is tightened until the gap S3 between the mounting bracket 36 and the damper mass 26 is a preselected amount, corresponding to the proper amount of preload being applied to the rubber donut 39. After all four of the biasing bolts have been threaded into the damper mass 26 and the biasing bolts 38 have been tightened the required amount, the damper mass and the donut support blocks 36 are mounted in the cover 22 in the same way as described above in connection with FIGS. 8 and 9. After the mounting screws 53 are used to fasten the donut support blocks in place in the cover, the biasing bolts 38 are then removed from the ends of the damper mass 26 and the donut support block 36 by means of the second set access holes 41 in the ends of the cover. Although the biasing bolts 38 are removed, the rubber donuts will be held in place by the pressure between the donut support blocks 36 that are attached to the cover by the mounting screws 53 and the ends 32 of the damping mass. Plugs 42 may be used to cover the access holes 40 and 41 to prevent dirt and debris from entering the cover 22.

Having thus described the device, various alterations and modifications will occur to those skilled in the art, which alterations and modifications will be within the scope of the attended claims.

I claim:

1. A tuned mass damper for a machine tool head mounted on the end of an arm having a rotary tool that moves in the X, Y, and Z directions and rotates around a C-axis that is coincident with the long axis of the arm, the damper comprising:

a pair of damper masses symmetrically arranged around the head, each damper mass having a center of gravity which is approximately in the geometric center of the damper mass, wherein the pair of damper masses are positioned on the head symmetrically around the center of the C-axis of rotation of the head;

a resilient mounting for each of the damper masses, whereby the damper masses damp out vibration in the X and Y directions regardless of the orientation of the head; and, a pair of support blocks for suspending each of the pair of damper masses, the pair of support blocks being spaced along the Z axis of the head.

2. The tuned mass damper of claim 1 further comprising:
a resilient mount between the support blocks and the damper masses; and,
a plurality of biasing members coupling the support blocks to the damper masses, the biasing members exerting a preload on the resilient mounts to achieve the desired damper frequency.

3. The tuned mass damper of claim 2 wherein the biasing members are symmetrically located around the center of gravity of the damper mass.

4. The tuned mass damper of claim 3 further comprising:
a compression member mounted on each biasing member for adjusting the preload on the resilient mount.

5. The tuned mass damper of claim 4 further comprising:
a threaded bolt comprising the biasing member;
a rubber donut comprising the resilient mount; and,
a spring comprising the compression member, whereby rotation of the threaded bolt alters the compressive force exerted by the spring to adjust the preload on the resilient mount.

6. The tuned mass damper of claim 3 further comprising:
a threaded bolt comprising the biasing member; and,
a rubber donut comprising the resilient mount; whereby rotation of the threaded bolt adjusts the preload on the rubber donut.

7. The tuned mass damper of claim 2 wherein the durometer of the resilient mounts is selected to achieve the desired damper frequency.

8. The tuned mass damper of claim 2 wherein the biasing members symmetrically engage the damper mass relative to the center of gravity of the damper mass that they are biasing.

9. The tuned mass damper of claim 1 further comprising:
a pair of support rods for suspending each of the pair of damper masses, the support rods passing through the damper masses along the Z-axis and being coupled to the damper masses only at their midpoint.

10. The tuned mass damper of claim 9 further comprising:
elongated passages in the pair of damper masses for receiving the support rods, the elongated passages having a diameter that is greater than the diameter of the support rods, the elongated passages having a reduced diameter section spaced midway between the ends of the elongated passages, the reduced diameter section being dimensioned to engage the midpoint of the support rods.

11. The tuned mass damper of claim 10 wherein the diameter of the support rods is selected so that the vibrational frequency of the support rods is approximately equal to the required damper frequency of the machine tool head.

12. The tuned mass damper of claim 11 further comprising:
mounting brackets for receiving both ends of each support rod; whereby the ends of the support rods are fixed in the mounting brackets and the remainder of the support rod is free to vibrate in response to the suspended weight of the damper mass.

13. The tuned mass damper of claim 9 wherein the support rods are symmetrically positioned relative to the center of gravity of the damper mass that they are supporting.

14. The tuned mass damper of claim 9 wherein the center of gravity of the damper mass is centered between the support rods in the Y-direction and between the resilient mounts in the Y-direction to avoid torsional forces about the Z-axis.

15. The tuned mass damper of claim 9 wherein the center of gravity of the damper mass is located on the plane of the support rods and the resilient mounts in the X-direction to avoid torsional forces about the Z-axis.

16. The tuned mass damper of claim 1 further comprising:
a cover for each of the damper masses, whereby the mounting brackets are attached to the covers and the covers are mounted on the head symmetrically around the C-axis of rotation of the head.

17. The tuned mass damper of claim 16 further comprising:
forks for supporting the multi-axis head, wherein the covers are mounted on the forks that support the multi-axis head.

18. The tuned mass damper of claim 1 wherein the center of gravity of the damper mass is centered in the Z-direction between the two ends of the damper mass to prevent inducing torsional forces about the X-axis.

* * * * *